United States Patent [19]

Willson

[11] Patent Number: 5,121,899
[45] Date of Patent: Jun. 16, 1992

[54] FUEL CONTROL VALVE CONSTRUCTION

[75] Inventor: James R. Willson, Midlothian, Va.

[73] Assignee: Robertshaw Controls Company, Richmond, Va.

[21] Appl. No.: 617,699

[22] Filed: Nov. 26, 1990

[51] Int. Cl.⁵ .................................................. F16K 31/128
[52] U.S. Cl. .................................. 251/30.02; 251/31; 251/61.3; 251/61.5
[58] Field of Search .................... 251/30.02, 31, 61.3, 251/61.5

[56] References Cited

U.S. PATENT DOCUMENTS

3,528,452  9/1970  Willson .............................. 137/495
4,269,028  5/1991  Hattori .............................. 251/31 X Primary Examiner—Gerald A. Michalsky
Attorney, Agent, or Firm—Candor, Candor & Tassone

[57] ABSTRACT

A fuel control valve construction having a flexible diaphragm defining two chambers that are disposed on opposite sides of the diaphragm that carries a main valve member that is urged in a direction to close a main valve seat by a spring, and a control unit interconnected to an inlet and an outlet and to the chambers and being adapted to interconnect the inlet to one of the two chambers and the outlet to the other of the two chambers to move the diaphragm to a first position that causes the main valve member to close the main valve seat whereby inlet pressure in the one chamber will generate an additional seating force on the main valve member to ensure a tight closure of the main valve seat and adapted to interconnect the inlet to the other of the two chambers and the outlet to the one of the two chambers to move the diaphragm to a second position that causes the main valve member to open the main valve seat.

18 Claims, 4 Drawing Sheets

FUEL CONTROL VALVE CONSTRUCTION

BACKGROUND OF THE INVENTION

1. Field of the Invention

This invention relates to a new fuel control valve construction and to new methods of making and operating such a fuel control valve construction.

2. Prior Art Statement

It is known to provide a fuel control valve construction comprising a housing means having an inlet and an outlet interconnected together by a main valve seat, a movable main valve member carried by the housing means for opening and closing the main valve seat, a flexible diaphragm carried by the housing means and defining two chambers therewith that are disposed on opposite sides of the diaphragm, the main valve member being interconnected to the diaphragm to be movable thereby, and main spring means operatively associated with the main valve member to tend to move the main valve member in a direction to close the main valve seat. For example, see the U.S. patent to James R. Willson, U.S. Pat. No. 3,528,452.

SUMMARY OF THE INVENTION

It is one feature of this invention to provide a new fuel control valve construction that utilizes the pressure of the fuel in the inlet means thereof to not only generate an additional seating force on the main valve member to ensure a tight closure of the main valve seat but to also utilize the pressure of the fuel in the inlet means to move that main valve member to an open position thereof while utilizing the pressure in the outlet means to act on the opposite side of a main diaphragm from the side on which the inlet pressure is acting.

In particular, it is believed according to the teachings of this invention that a unique valve structure can be provided for interconnecting the inlet of the fuel control valve construction to one of the two chambers defined on opposite sides of a main valve member operating diaphragm and the outlet to the other of those two chambers when the valve structure is in a first condition thereof to thereby move the diaphragm to a first position thereof that causes the main valve member to close the main valve seat thereof whereby pressure in the inlet and, thus, in the one chamber will generate an additional seating force on the main valve member to ensure a tight closure of the main valve seat and is adapted to interconnect the inlet to the other of the two chambers and the outlet to the one of the two chambers when the valve structure is in a second condition thereof to thereby move the diaphragm to a second position thereof that causes the main valve member to open the main valve seat.

For example, one embodiment of this invention comprises a fuel control valve construction comprising a housing means having a inlet and an outlet interconnected together by a main valve sea, a movable main valve member carried by the housing means for opening and closing the main valve seat, a flexible diaphragm carried by the housing means and defining two chambers therewith that are disposed on opposite sides of the diaphragm, the main valve member being interconnected to the diaphragm to be movable thereby, main spring means operatively associated with the main valve member to tend to move the main valve member in a direction to close the main valve seat, and control means interconnected to the housing means and being interconnected to the inlet and the outlet and to the chambers and having valve means adapted to interconnect the inlet to one of the two chambers and the outlet to the other of the two chambers when the valve means is in a first condition thereof to thereby move the diaphragm to a first position thereof that causes the main valve member to close the main valve seat whereby pressure in the inlet and, thus, in the one chamber will generate an additional seating force on the main valve member to ensure a tight closure of the main valve seat and adapted to interconnect the inlet to the other of the two chambers and the outlet to the one of the two chambers when the valve means is in a second condition thereof to thereby move the diaphragm to a second position thereof that causes the main valve member to open the main valve seat.

Accordingly, it is an object of this invention to provide a new fuel control valve construction having one or more of the novel features of this invention as set forth above or hereinafter shown or described.

Another object of this invention is to provide a new method of making such a fuel control valve construction, the method of this invention having one or more of the novel features of this invention as set forth above or hereinafter shown or described.

Another object of this invention is to provide a new method for operating such a fuel control valve construction, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

DESCRIPTION OF THE PREFERRED EMBODIMENTS

While the various features of this invention are hereinafter illustrated and described as being particularly adapted to provide a fuel control valve construction for controlling the supply of gaseous fuel to a burner means for heating a water heater tank, it is to be understood that the various features of this invention can be utilized singly or in various combinations thereof to provide a fuel control valve construction for supplying fuel for other purposes as desired.

Therefore, this invention is not to be limited to only the embodiments illustrated in the drawings, because the drawings are merely utilized to illustrate one of the wide variety of uses of this invention.

Figure 1:
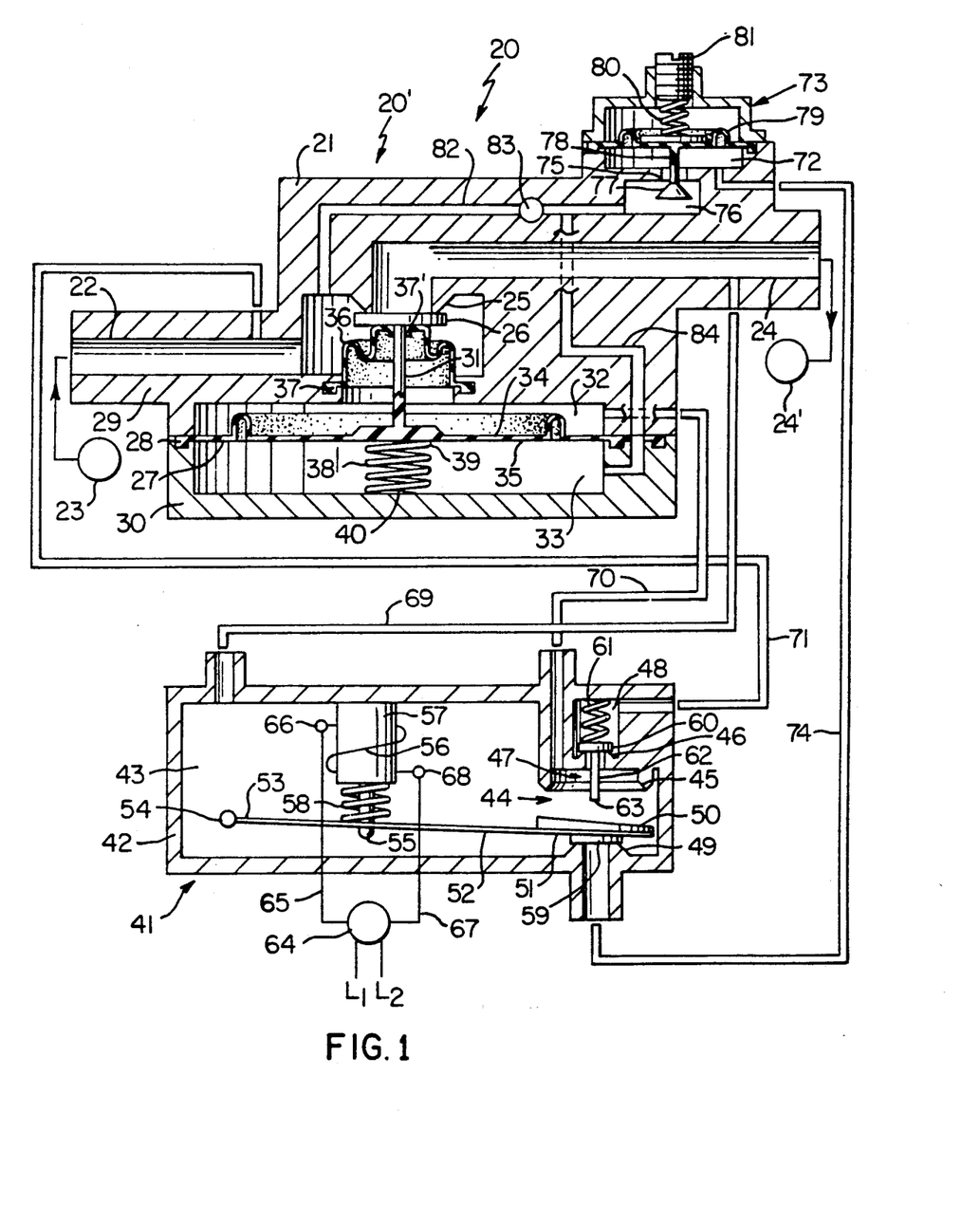
FIG. 1 is a schematic view in cross section and illustrates the new fuel control valve construction of this invention, the main valve member thereof being disposed in the closed condition thereof.
Figure 2:
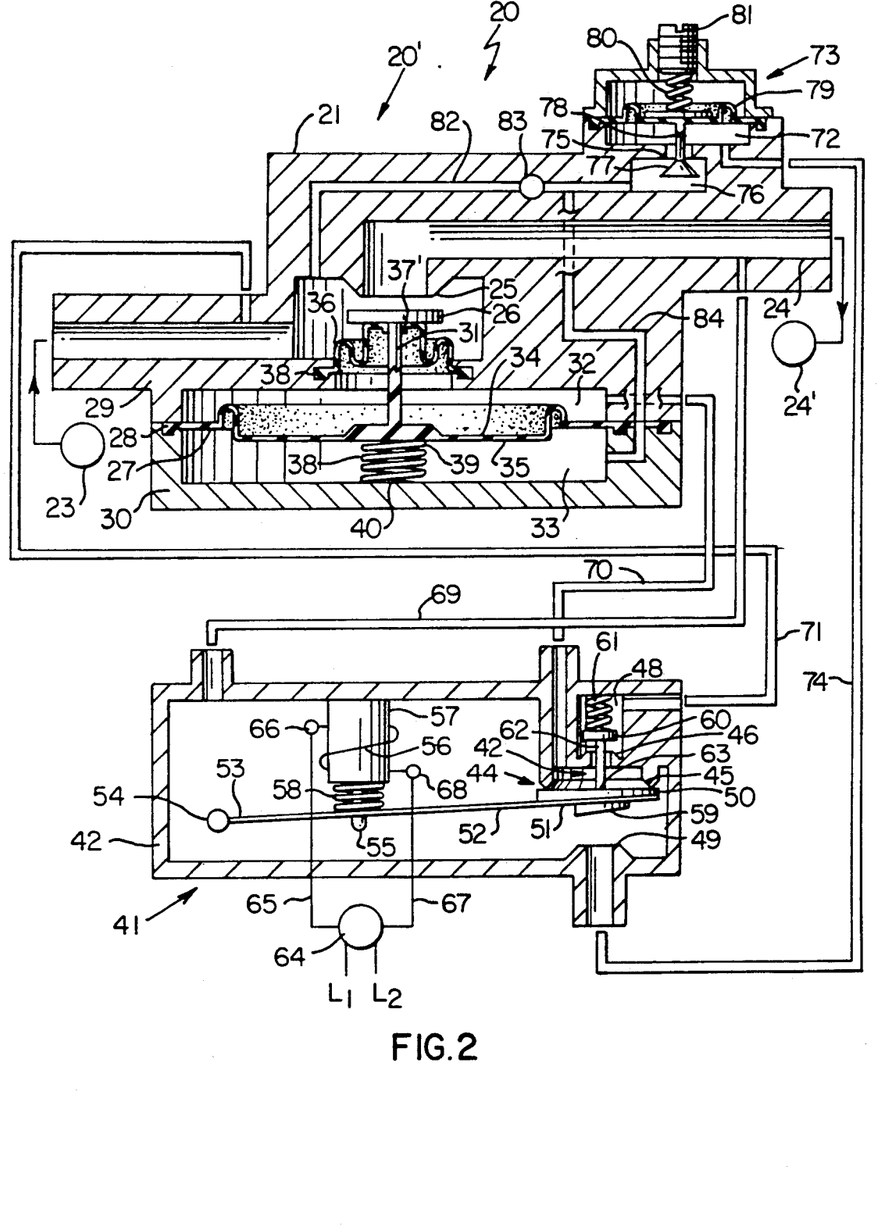
FIG. 2 is a view similar to FIG. 1 and illustrates the fuel control valve construction of FIG. 1 with the main valve member in the open condition thereof.

Referring now to FIGS. 1 and 2, a new fuel control valve construction of this invention is generally indicated by the reference numeral 20 and comprising a housing means 21 having an inlet 22 for being interconnected to a fuel source 23 in a conventional manner and an outlet 24 for being interconnected to a main burner means 24' in a conventional manner, the housing means 21 having a main valve seat 25 for interconnecting the inlet 22 to the outlet 24.

The fuel control valve construction 20 has a movable main valve member 26 carried by the housing means 21 and being adapted to open and close the main valve seat 25.

A flexible diaphragm 27 is carried by the housing means 21, such as by having an outer peripheral edge means 28 thereof held between two housing parts 29 and 30 of the housing means 21 as illustrated, and having a center post means 31 thereof being interconnected to the main valve member 26 so that the main valve member 26 moves with movement of the main flexible diaphragm 27. While the main diaphragm 27 is illustrated as having the post means 31 as being integral and one-piece thereof, it is to be understood that the post means 31 could be a part that is separate from the flexible diaphragm 27 and the flexible diaphragm 27 could have a rigid backup plate as conventional in the art, if desired. However, the main valve member 26 would still be interconnected to the main diaphragm 27 by the post means so that the main valve member 26 would move in unison with the flexible diaphragm 27 for a purpose hereinafter set forth.

The flexible diaphragm 27 cooperates with the housing means 21 to define two chambers 32 and 33 respectively on opposite sides 34 and 35 of the diaphragm 27 so that the chambers 32 and 33 are sealed from each other.

A small flexible sealing diaphragm 36 has its outer peripheral edge means 37 carried by the housing means 21 and its inner peripheral surface means 37' sealed to the post means 31 whereby the sealing diaphragm 36 seals the chamber 32 from the inlet 22 as illustrated in the drawings.

A main compression spring means 38 is disposed in the chamber 33 and has one end 39 bearing against the flexible diaphragm 27 and the other end 40 thereof bearing against the housing means 21 whereby the force of the main spring means 38 tends to move the diaphragm 27 upwardly in FIG. 1 and, thus, the valve member 26 upwardly therewith to tend to close the valve seat 25 with a certain spring force whereby the main spring means 38 is operatively associated with the main valve member 26 to tend to move the main valve member 26 in a direction to close the main valve seat 25.

However, when the flexible diaphragm 27 is moved downwardly from the position illustrated in FIG. 1 to the position illustrated in FIG. 2 in a manner hereinafter set forth, it can be seen that the diaphragm 27 moves in opposition to the force of the main spring means 38 to carry the main valve member 26 therewith to thereby open the main valve seat 25 and interconnect the fuel source 23 with the main burner means 24' for operating the main burner means 24' in a manner well known in the art.

For example, see the aforementioned U.S. patent to James R. Willson, U.S. Pat. No. 3,528,452, wherein a similar diaphragm operated fuel control valve construction is disclosed whereby this U.S. patent is being incorporated into this disclosure by this reference thereto.

The fuel control device disclosed in the aforementioned U.S. patent to Willson, U.S. Pat. No. 3,528,452, provides for pilot burner ignition of the fuel issuing to the main burner means thereof and has an automatic safety valve in the inlet means thereof in advance of the main valve seat for preventing interconnection of the inlet to the outlet should a flame not be present at the pilot burner means and/or main burner means, such diaphragm operated fuel control device having a main on/off valve means disposed intermediate such safety valve means and the main valve seat thereof whereby such structure is not shown for the fuel control valve constructions of this invention with the understanding that such fuel control valve constructions of this invention would have such structure in advance of the main valve seat, such as the valve seat 25 thereof, and that the main burner means, such as the main burner means 24' thereof, could be provided with pilot ignition, or direct spark ignition as desired so that whenever fuel is directed to the main burner means 24' by the main valve member 26 opening the main valve seat 25, the fuel issuing from the burner means 24' will be ignited in a suitable manner and should such ignition not take place, the valve control device 20 of this invention will automatically close the inlet 22 from the main valve seat 25, all in a manner well known in the art. For example, see the U.S. patent to Kelly et al, U.S. Pat. No. 4,787,414 and the U.S. patent to Kelly, U.S. Pat. No. 4,549,571 whereby these two patents are being incorporated into this disclosure by this reference thereto.

Thus, it can be seen that the fuel control valve construction 20 of this invention is being illustrated in FIGS. 1 and 2 as being part of a fuel control system of this invention that is generally indicated by the reference numeral 20' that includes the fuel source 23 and main burner means 24' and can include a pilot ignition means (not shown) or direct spark ignition means (not shown) as desired.

The fuel control valve construction 20 also comprises a control means that is generally indicated by the reference numeral 41 that has a housing member 42 either formed separately from the housing means 21 as illustrated or being secured to the housing means 21 or even being integrally formed with the housing means 21 if desired.

In any event, the control means 41 comprises a valve means that is disposed within a chamber means 43 of the housing part 42 and is generally indicated by the reference numeral 44.

The valve means 44 of the control means 41 comprises a first annular valve seat 45 formed from the housing member 42 and projecting into the chamber 43 thereof and a second valve seat 46 formed within the first valve seat 45 in spaced apart relation therefrom to define an area 47 therebetween and leading to an internal chamber 48 of the housing member 42. The valve means 44 also comprises a third valve seat 49 formed from the housing member 42 and directed into the chamber 43 thereof in substantially an aligned relation with the first valve seat 45 and in spaced apart relation thereto as illustrated.

The valve means 44 of the control means 41 comprises a first movable valve member 50 for opening and closing the first valve seat 45 and being carried on one end 51 of a lever 52 that has its otherend 53 pivotally mounted to the housing member 42 within the chamber 43 by a pivot pin means 54 in any suitable manner, the lever 52 being interconnected to a plunger 55 that is controlled by an electrical coil means 56 in a manner well known in the art so that when an electrical current is directed through the coil means 56, the plunger 55 is drawn upwardly within a housing or cylinder means 57 in opposition to the force of a compression spring 58 to move the valve member 50 from the position illustrated in FIG. 1 to the position illustrated in FIG. 2 to close the first valve seat 45 and when the electrical current through the coil means 56 is terminated, the spring means 58 returns the lever 52 from the position illustrated in FIG. 2 to the position illustrated in FIG. 1 wherein the first valve member 50 opens the first valve seat 45 and a third valve member 59 carried on the end 51 of the lever 52 closes against the third valve seat 49 in the manner illustrated in FIG. 1 for a purpose hereinafter set forth.

The valve means 44 of the control means 41 comprises a second movable valve member 60 disposed within the chamber 48 and normally urged to a closed position against the second valve seat 46 by a compression spring 61 also disposed in the chamber 48, the second valve member 60 having a stem 62 extending therefrom through the second valve seat and having an end 63 extending beyond the first valve seat 45 in the manner illustrated in FIG. 1 when the second valve member 60 is closing the second valve seat 46. In this manner, when the lever 52 is pivoted upwardly from the position illustrated in FIG. 1 to the position illustrated in FIG. 2, the first valve member 50 engages against the end 63 of the stem 62 of the second valve member 60 and moves the second valve member 60 away from the second valve seat 46 in opposition to the force of the compression spring 61 before the first valve member 50 seats against the first valve seat 45 as illustrated in FIG. 2 so that the first valve member 50 has means that opens the second valve member 60 away from the second valve seat 46 when the first valve member 50 is in the position of FIG. 2 that closes the first valve seat 45 for a purpose hereinafter set forth.

However, when the lever 52 is pivoted downwardly from the position illustrated in FIG. 2 to the position illustrated in FIG. 1 to move the first valve member 50 away from the first valve seat 45, the force of the compression spring 61 moves the second valve member 60 downwardly to close the second valve seat 46 as illustrated in FIG. 1 for a purpose hereinafter set forth.

The control means 41 of the fuel control valve construction 20 comprises a suitable temperature operated device 64 that is adapted to interconnect an electrical power source lead L1 with a lead 65 that is interconnected to one side 66 of the coil means 56 and another electrical power source lead L2 to a lead 67 that is interconnected to the other side 68 of the coil means 56 when the device 64 determines that the main burner means 24' should be in an on condition thereof and disconnects the electrical power source leads L1 and L2 from the opposed sides 66 and 68 of the coil means 56 when the device 64 determines that the burner means 24' should be in an off condition whereby it can be seen that the thermostatically operated device 64 operates in a manner conventional in the art. For example, see the aforementioned U.S. patent to James R. Willson, U.S. Pat. No. 3,528,452; U.S. patent to Kelly et al, U.S. Pat. No. 4,787,414 and the U.S. patent to Kelly, U.S. Pat. No. 4,549,571.

The housing member 42 of the control means 41 has the chamber 43 thereof always interconnected to the outlet 24 by a passage defining means 69. The area 47 defined between the first valve seat 45 and the second valve seat 46 is always interconnected to the chamber 32 by a passage defining means 70. The chamber 48 of the housing member 42 is always interconnected to the inlet 22 by a passage defining means 71.

The third valve seat 49 of the housing member 42 is always interconnected to an outlet chamber 72 of a pressure regulator means 73 by a passage defining means 74, the pressure regulator means 73 being carried by the housing means 21 and comprising a valve seat 75 that separates an inlet chamber 76 from the outlet chamber 72 and being controlled by a valve member 77 carried on the end of a stem 78 of a flexible diaphragm 79 that cooperates with the housing means 21 to define the outlet chamber 72 therewith. The flexible diaphragm 79 is urged in a direction to open the valve member 77 away from the valve seat 75 by a compression spring 80 that has its force adjusted by suitable adjusting means 81 in a manner well known in the art.

The inlet 22 is interconnected to the inlet chamber 76 of the pressure regulator 73 by a passage defining means 82 that has a restrictor means 83 disposed therein.

The passage defining means 82 downstream of the restrictor means 83 and upstream of the valve seat 75 is interconnected by a passage defining means 84 to the chamber 33 as illustrated.

Therefore, it can be seen that the fuel control valve construction 20 of this invention can be made by the method of this invention from the parts illustrated in FIG. 1 to operate by the method of this invention in a manner now to be described.

With the inlet 22 of the fuel control valve construction interconnected to the fuel source 23 and with the thermostatic control means 64 in a condition that the same is sensing that the burner means 24' should be in an off condition so that the power source leads L1 and L2 are not interconnected to the coil means 56 whereby the compression spring 58 maintains the first valve member 50 away from the first valve seat 45 and the third valve member 59 against the third valve seat 49 so that the spring means 61 maintains the second valve member 60 closed against the second valve seat 46, not only does the force of the compression spring 38 acting on the main flexible diaphragm 27 urge the main valve member 26 closed against the main valve seat 25, but also the pressure of the fuel being directed into the inlet 22 from the fuel source 23 acts in the chamber 33 on the side 35 of the diaphragm 27 to generate an additional seating force on the main valve member 26 in a direction to close the main valve seat 25 and thereby ensure a tight closure of the main valve member 26 against the main valve seat 25. In particular, with the fuel control valve construction 20 in the condition illustrated in FIG. 1, the inlet 22 is interconnected to the chamber 33 by the passage defining means 82 and the interconnecting passage defining means 84 with the pressure regulator 73 permitting the pressure in the chamber 33 to build up to the inlet pressure because the outlet chamber 72 of the pressure regulator 73 is closed from the outlet 24 by the third valve member 59 holding closed the valve seat 49 as illustrated in FIG. 1.

However, when the thermostatically operated device 64 determines that the main burner means 24' should be in an on condition thereof, the device 64 interconnects the power source leads L1 and L2 to the sides 66 and 68 of the coil means 56 whereby the energized coil means 56 draws the plunger 55 upwardly into the cylinder or housing means 57 thereof in the manner illustrated in FIG. 2 whereby the lever 52 is pivoted upwardly in opposition to the force of the spring 58 to cause the third valve member 59 to move away from the third valve seat 49, the first valve member 50 to engage the end 63 of the stem 62 of the second valve member 60 and move the second valve member 60 away from the second valve seat 46 in opposition to the force of the compression spring 61 and then place the first valve member 50 against the first valve seat 45 to close the same as illustrated in FIG. 2.

In this manner, the inlet 22 is effectively interconnected to the chamber 32 and the outlet 24 is interconnected to the chamber 33 whereby the resulting pressure differential across the main flexible diaphragm 27 causes the main flexible diaphragm 27 to move downwardly in opposition to the force of the compression spring 38 and thereby move the main valve member 26 away from the main valve seat 25 to interconnect the inlet means 22 to the outlet means 24 whereby the fuel source 23 is interconnected to the main burner means 24' to issue from the same and be ignited in the manner previously set forth.

In particular, the inlet 22 is interconnected to the chamber 32 by the passage defining means 71, opened second valve seat 46, area 47 and passage defining means 70 while the chamber 33 is interconnected to the outlet 24 by the passage defining means 84, chamber 76, chamber 72, passage defining means 74, opened third valve seat 49, chamber 43 of the housing member 42 and passage defining means 69.

Thus, the main burner means 24' will continue to operate until the temperature sensing device 64 again determines that the burner means 24' should be in an off condition and thereby disconnects the power source leads L1 and L2 from the coil means 56 so that the de-energized coil means 56 permits the compression spring 58 to move the lever 52 downwardly from the position illustrated in FIG. 2 to the position illustrated in FIG. 1 whereby the compression spring 61 closes the second valve member 60 against the second valve seat 46 and the third valve member 59 closes the third valve seat 49 while the first valve member 50 opens the first valve seat 45.

In this manner, the pressure that had been previously in the chamber 32 is vented to the outlet 24 by means of the passage defining means 70, area 47, opened first valve seat 45, chamber 43 of the housing member 42 and passage defining means 69 while the chamber 33 is effectively interconnected to the inlet 22 by means of the passage 82, restrictor 83 and passage 84 as the outlet chamber 72 of the pressure regulator 73 is blocked from the outlet 24 by the closed third valve seat 49 as illustrated.

Accordingly, the resulting pressure differential across the flexible diaphragm 27 moves the flexible diaphragm 27 upwardly in the same direction that force of the main spring 38 is tending to move the diaphragm 27 whereby the main valve member 26 is moved upwardly to close the main valve seat 25 and terminate the flow of fuel to the main burner 24'.

Thus, it can be seen that the pressure of the fuel in the inlet means 22 of the fuel control valve construction 20 of this invention is utilized to generate an additional seating force to the force of the main spring 38 on the main valve member 26 when the main valve member 26 is closing the main valve seat 25 to ensure full closure of the main valve seat 25 and the pressure in the inlet 22 is utilized to open the main valve member away from the valve seat 25 in the manner illustrated in FIG. 2.

Figure 3:
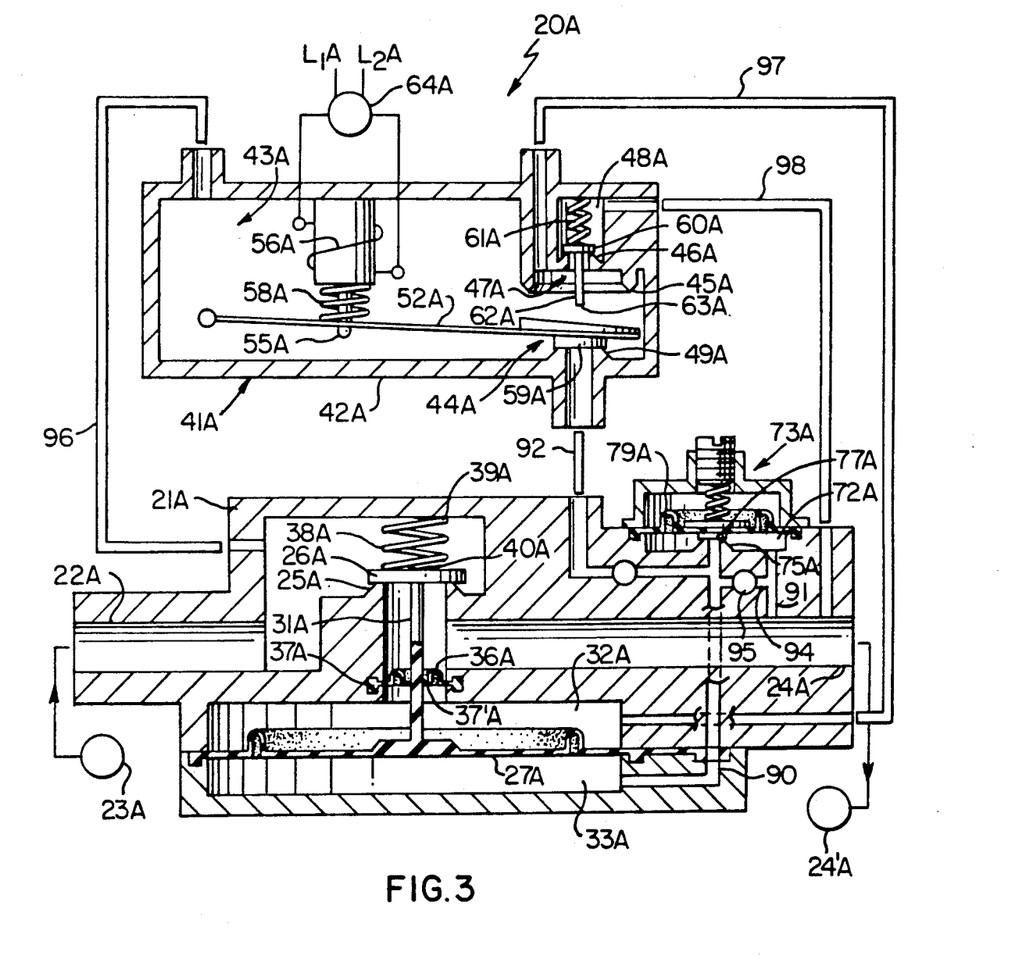
FIG. 3 is a view similar to FIG. 1 and illustrates another fuel control valve construction of this invention, FIG. 3 illustrating the fuel control valve construction with its main valve member in its closed condition.
Figure 4:
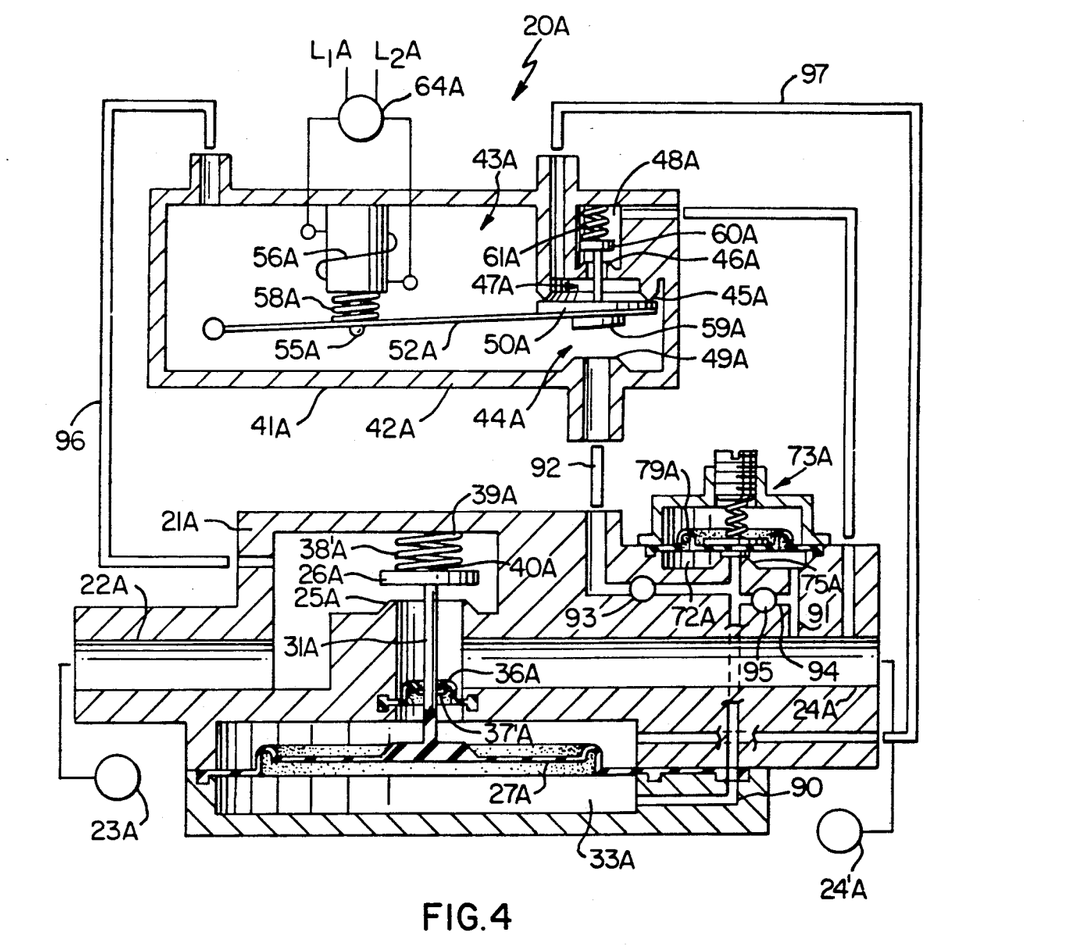
FIG. 4 is a view similar to FIG. 3 and illustrates the fuel control valve construction of FIG. 3 with its main valve member in the open condition thereof.

Another fuel control valve construction of this invention is generally indicated by the reference numeral 20A in FIGS. 3 and 4 and parts thereof similar to the fuel control valve construction previously described are indicated by like reference numerals followed by the reference letter "A".

As illustrated in FIGS. 3 and 4, it can be seen that the fuel control valve construction 20A is in general similar to the fuel control valve construction 20 except that the main valve seat 25A is disposed intermediate the main valve member 26A and the flexible diaphragm 27A with the post means 31A of the diaphragm 27A being adapted to project through the main valve seat 25A to carry the main valve member 26A to its open condition as illustrated in FIG. 4 in opposition to the force of the main compression spring 38A that has the one end 39A thereof bearing against the housing means 21A and the other end 40A thereof bearing against the main valve member 26A.

Also, the sealing diaphragm 36A has its outer periphery 37A carried by the housing means 21A and its inner periphery 37'A interconnected to the post means 31A in such a manner that the sealing diaphragm means 36A seals the chamber 32A from the outlet 24A as well as from the valve seat 25A as illustrated.

The control means 41A of the fuel control valve construction 20A is substantially identical to the control means 41 previously described except that the same has the parts thereof interconnected to the housing means 21A in a different manner as hereinafter set forth.

Also, the pressure regulator means 73A for the fuel control valve construction has the valve member 77A thereof carried by the flexible diaphragm 79A so as to directly contact the valve seat 75A in a bleed manner. The valve seat 75A of the pressure regulator 73A is interconnected by a passage defining means 90 to the chamber 33A while the outlet chamber 72A of the pressure regulator 73A is interconnected to the outlet 24A by a passage defining means 91.

The passage defining means 90 is also interconnected to the third valve seat 49A of the valve means 44A of the control means 41A by a passage defining means 92, the passage defining means 92 having a restrictor 93 therein intermediate the valve seat means 49A and the passage defining means 90 as illustrated.

In addition, the passage defining means 90 is interconnected to the passage defining means 91 by a passage defining means 94 which has a restrictor 95 therein intermediate the passage defining means 90 and 91 as illustrated.

The chamber 43A of the housing member 42A of the control means 41A is interconnected to the inlet 22A by a passage defining means 96.

The area 47A between the first valve seat 45A and second valve seat 46A of the housing member 42A of the control means 41A is interconnected by a passage defining means 97 to the chamber 32A while the chamber 48A of the housing member 42A is interconnected to the outlet 24A by a passage defining means 98.

Thus, it can be seen that the fuel control valve construction 20A of this invention can be made by the method of this invention from the parts illustrated in FIGS. 3 and 4 in a manner similar to the method of making the fuel control valve construction 20 of FIGS. 1 and 2 and can operate in the system 20'A of this invention according to the method of operation of this invention in a manner now to be described.

When the thermostatically operated device 64A of the fuel control valve construction 20A determines that the burner means 24'A is to be in an off condition and the inlet 22A is interconnected to fuel source 23A, the fuel control valve construction 20A is in the condition illustrated in FIG. 3 wherein the coil means 56A is in its de-energized condition so that the compression spring 58A has the lever 52A in its downward pivoted position so that the third valve member 59A has the third valve seat 49A in its closed condition and the first valve member 50A is in an open position relative to the first valve seat 45A whereby the second valve member 60A is in its closed condition against the second valve seat 46A by the force of the compression spring 61A. In this manner, the pressure of the fuel in the inlet 22A of the housing means 21A is received in the chamber 32A whereby the resulting pressure differential across the flexible diaphragm 27A tends to move the flexible diaphragm 27A downwardly in FIG. 3 so as to add an additional force to the force of the compression spring 38A in holding the main valve member 26A against the main valve seat 25A so as to tend to prevent fluid communicating between the inlet 22A and the outlet 24A. Under this condition, the inlet 22A is interconnected to the chamber 32A by the passage defining means 96, the chamber 43A of the housing member 42A, the open first valve seat 45A, the area 47A and the passage defining means 97 as illustrated. The chamber 33A is interconnected to the outlet 24A under this condition by means of the passage defining means 94, the restrictor 95 and the passage defining means 91 as the chamber 43A of the housing member 42A is disconnected from the chamber 33A by the third valve member 59A being in a closed condition against the third valve seat 49A as illustrated in FIG. 3.

When the thermostatically operated means 64A determines that the burner means 24'A should be in an on condition, the thermostatically operated means 64A interconnects the power source leads L1A and L2A to the coil means 56A whereby the energized coil means 56A pulls upwardly on the plunger 55A to pivot the lever 52A upwardly in opposition to the force of the compression spring 58A in the manner illustrated in FIG. 4 not only to open the third valve seat 49A but also to open the second valve seat 46A by the valve member 50A engaging against the end 63A of the stem 62A of the second valve member 60A to move the second valve member 60A away from the second valve seat 46A in opposition to the force of the compression spring 61A with the first valve member 50A thereafter closing against the first valve seat 45A in the manner illustrated in FIG. 4.

In this manner, the pressure of the fuel in the inlet means 22A is directed to the chamber 33A while the chamber 32A is interconnected to the outlet 24A so that the resulting pressure differential acting across the flexible diaphragm 27A drives the flexible diaphragm 27A upwardly in opposition to the force of the compression spring 38A to move the main valve member 26A away from the main valve seat 25A to interconnect the inlet 22A to the outlet 24A so that fuel can issue from the burner means 24'A to be ignited in any suitable manner.

In particular, the inlet 22A is interconnected to the chamber 33A by the passage defining means 96, chamber 43A of the housing member 42A, the open third valve seat 49A, the passage defining means 92, the restrictor 93 and the passage defining means 90. The chamber 32A is interconnected to the outlet 24A by the passage defining means 97, area 47A, open second valve seat 46A and the passage defining means 98 as illustrated in FIG. 4.

During the time that the main valve member 26A is in an open condition relative to the main valve seat 25A as illustrated in FIG. 4, it can be seen that the pressure regulator 73A regulates the pressure of the fuel being directed to the chamber 33A as the diaphragm 79A can move the valve member 77A away from the valve seat 75A to interconnect the outlet chamber 72A to the outlet 24A by way of the passage defining means 91 in the normal manner of operation of a pressure regulator means for such purpose. For example see the aforementioned U.S. patent to Kelly et al, U.S. Pat. No. 4,787,414.

When the thermostatically operated means 64A now determines that the operating burner means 24'A should cease the operation thereof, the thermostatically operated means 64A disconnects the power source leads L1A and L2A from the coil means 56A so that the de-energized coil means 56A permits the compression spring 58A to drive the lever 52A downwardly from the condition illustrated in FIG. 4 back to the condition illustrated in FIG. 3 whereby the third valve member 59A closes the third valve seat 49A while the first valve member 50A opens the first valve seat 45A and permits the second valve member 60A to be closed against the second valve seat 46A by the force of the compression spring 61A.

In this manner, the chamber 32A is again interconnected to the inlet 22A while the chamber 33A is again interconnected to the outlet 24A so that the resulting pressure differential acting across the flexible diaphragm 27A will drive the diaphragm 27A downwardly to assist the force of the compression spring 38A in moving the main valve member 26A against the main valve seat 25A and maintaining the main valve member 26A against the main valve seat 25A to prevent fluid communication between the inlet 22A and outlet 24A.

In particular, the chamber 32A is interconnected to the inlet 22A by the passage defining means 96, the chamber 43A of the housing member 42A, the open first valve seat 45A, the area 47A and the passage defining means 97 while the chamber 33A has the previous pressure therein vented to the outlet means 24A by means of the passage defining means 90, the passage defining means 94, the restrictor 95, and the passage defining means 91 as the valve member 77A of the pressure regulator 73A closes against the valve seat 75A as the chamber 43A of the housing member 42A is disconnected from the passage defining means 92 by having the third valve seat 49A closed by the third valve member 59A as illustrated in FIG. 3.

Therefore, it can be seen that in both embodiments of the fuel control valve construction 20 and 20A of this invention, the pressure of the fuel in the inlet thereof is utilized to generate an enhanced seating force to ensure a tight closure of the main valve member against the main valve seat while venting the chamber on the other side of the main diaphragm to the outlet and, when it is desired to open the main valve member away from the main valve seat, the pressures in the chambers on each side of the main diaphragm are reversed so that the pressure of the fuel in the inlet means is utilized to move the main valve member to an open condition thereof while the pressure on the other side of the main diaphragm is vented to the outlet means.

Thus, this invention not only provides a new fuel control valve construction, but also this invention provides new methods of making and operating such a fuel control valve construction.

While the forms and methods of this invention now preferred have been illustrated and described as required by the Patent Statute, it is to be understood that other forms and method steps can be utilized and still fall within the scope of the appended claims wherein each claim sets forth what is believed to be known in each claim prior to this invention in the portion of each claim that is disposed before the terms "the improvement" and sets forth what is believed to be new in each claim according to this invention in the portion of each claim that is disposed after the terms "the improvement" whereby it is believed that each claim sets forth a novel, useful and unobvious invention within the purview of the Patent Statute.

What is claimed is:

1. In a fuel control valve construction comprising a housing means having an inlet and an outlet interconnected together by a main valve seat, a movable main valve member carried by said housing means for opening and closing said main valve seat, a flexible diaphragm carried by said housing means and defining two chambers therewith that are disposed on opposite sides of said diaphragm, said main valve member being interconnected to said diaphragm to be movable thereby, and main spring means operatively associated with said main valve member to tend to move said main valve member in a direction to close said main valve seat with a certain spring force, the improvement comprising control means interconnected to said housing means and being interconnected to said inlet and said outlet and to said chambers and having valve means adapted to interconnect said inlet to one of said two chambers and said outlet to the other of said two chambers when said valve means is in a first condition thereof thereby move said diaphragm to a first position thereof that causes said main valve member to close said main valve seat whereby pressure in said inlet and thus in said one chamber will generate an additional seating force on said main valve member that augments said certain spring force to ensure a tight closure of said main valve seat and adapted to interconnect said inlet to said other of said two chambers and said outlet to said one of said two chambers when said valve means is in a second condition thereof to thereby move said diaphragm to a second position thereof that causes said main valve member to open said main valve seat.

2. A fuel control valve construction as set forth in claim 1 wherein said main valve member is disposed intermediate said diaphragm and said main valve seat.

3. A fuel control valve construction as set forth in claim 1 wherein said main valve seat is disposed intermediate said diaphragm and said main valve member.

4. A fuel control valve construction as set forth in claim 1 wherein said diaphragm has opposed sides and has a post extending from one of said sides thereof and interconnecting to said main valve member whereby said main valve member is carried by post.

5. A fuel control valve construction as set forth in claim 4 and comprising a flexible sealing means carried by said housing means and being interconnected to said post intermediate said diaphragm and said main valve member to separate the chamber defined between said one of said sides of said diaphragm and said sealing means from said main valve member.

6. In a fuel control valve construction comprising a housing means having an inlet and an outlet interconnected together by a main valve seat, a movable main valve member carried by said housing means for opening and closing said main valve seat, a flexible diaphragm carried by said housing means and defining two chambers therewith that are disposed on opposite sides of said diaphragm, said main valve member being interconnected to said diaphragm to be movable thereby, and main spring means operatively associated with said main valve member to tend to move said main valve member in a direction to close said main valve seat with a spring force, the improvement comprising control means interconnected to said housing means and being interconnected to said inlet and said outlet and to said chambers and having valve means adapted to interconnect said inlet to one of said two chambers and said outlet to the other of said two chambers when said valve means is in a first condition thereof thereby move said diaphragm to a first position thereof that causes said main valve member to close said main valve seat whereby pressure in said inlet and thus in said one chamber will generate an additional seating force on said main valve member that augments said certain spring force to ensure a tight closure of said main valve seat and adapted to interconnect said inlet to said other of said two chambers and said outlet to said one of said two chambers when said valve means is in a second condition thereof to thereby move said diaphragm to a second position thereof that causes said main valve member to open said main valve seat, said valve means of said control means comprising a first valve seat and a second valve seat disposed within said first valve seat, said valve means of said control means comprising a first movable valve member for opening and closing said first valve seat and a second movable valve member for opening and closing said second valve seat, said first valve member being adapted to cause said second valve member to open said second valve seat when said first valve member is moved to close said first valve seat and being adapted to cause said second valve member to close said second valve seat when said first valve member is moved to open said first valve seat, said valve means of said control means having a third valve seat, said first valve member being adapted to close said third valve seat when being moved to open said first valve seat and being adapted to open said third valve seat when being moved to close said first valve seat.

7. A fuel control valve construction as set forth in claim 6, wherein said valve means of said control means comprises a first spring means operatively associated with said first valve member to tend to move said first valve member to open said first valve seat and to close said third valve seat, said valve means of said control means comprising a second spring means operatively associated with said second valve member to tend to close said second valve seat.

8. A fuel control valve construction as set forth in claim 7 wherein said control means has operator means operatively associated with said first valve member to cause said first valve member to move to close said first valve seat when said operator means is in one condition thereof and to cause said first valve member to move to open said first valve seat when said operator means is in another condition thereof.

9. A fuel control valve construction as set forth in claim 8 wherein said operator means comprises an electrically operated plunger means.

10. A fuel control valve construction as set forth in claim 6 wherein said second valve seat is spaced from said first valve seat to define a first area therebetween and said first valve seat is spaced from said third valve seat to define a second area therebetween.

11. A fuel control valve construction as set forth in claim 10 wherein said control means has means interconnecting said first area to said other chamber, interconnecting said second area to said outlet, interconnecting said second valve seat to said inlet, and interconnecting said third valve seat to said inlet.

12. A fuel control valve construction as set forth in claim 11 and comprising restrictor means interconnecting said inlet with said one chamber.

13. A fuel control valve construction as set forth in claim 12 wherein said restrictor means also interconnects said inlet with said third valve seat.

14. A fuel control valve construction as set forth in claim 12 and comprising a pressure regulator that interconnects said restrictor means to said third valve seat.

15. A fuel control valve construction as set forth in claim 10 wherein said control means has means interconnecting said first area to said one chamber, interconnecting said second area to said inlet, interconnecting said second valve seat to said outlet, and interconnecting said third valve seat to said other chamber.

16. A fuel control valve construction as set forth in claim 15 and comprising a restrictor means interconnecting said third valve seat with said other chamber.

17. A fuel control valve construction as set forth in claim 15 and comprising a pressure regulator that interconnects said other chamber with said outlet.

18. A fuel control valve construction as set forth in claim 17 and comprising another restrictor means interconnecting said other chamber with said outlet in parallel relation to said pressure regulator.

* * * * *